F. G. DICKERSON.
CAN FILLING MACHINE.
APPLICATION FILED JULY 1, 1912. RENEWED JUNE 9, 1920.
1,365,773.
Patented Jan. 18, 1921.
7 SHEETS—SHEET 3.
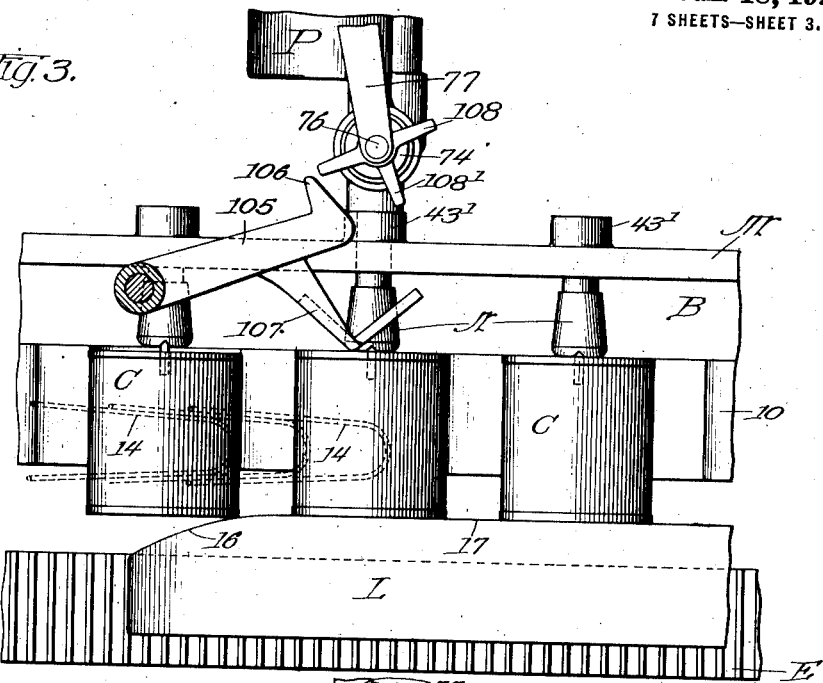
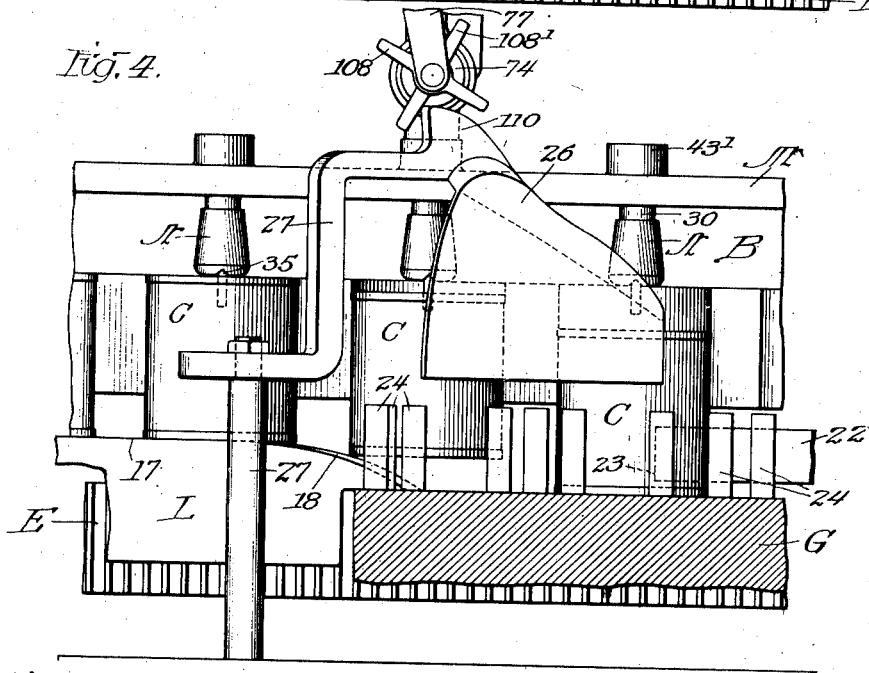
Witnesses:
Robert J. Weir
Arthur Carlson
Inventor:
Fred G. Dickerson.
by Brown & Hopkins
Attys

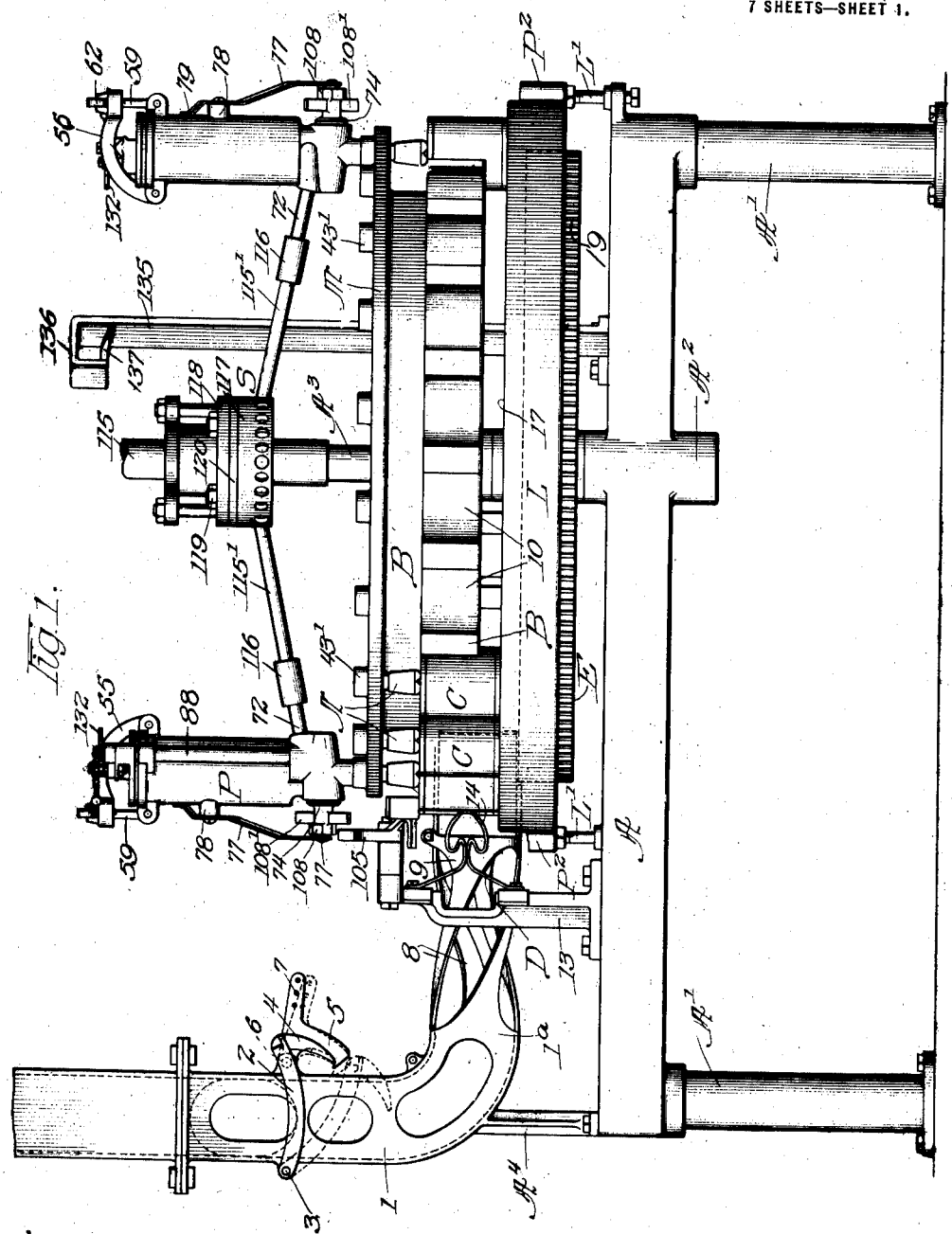

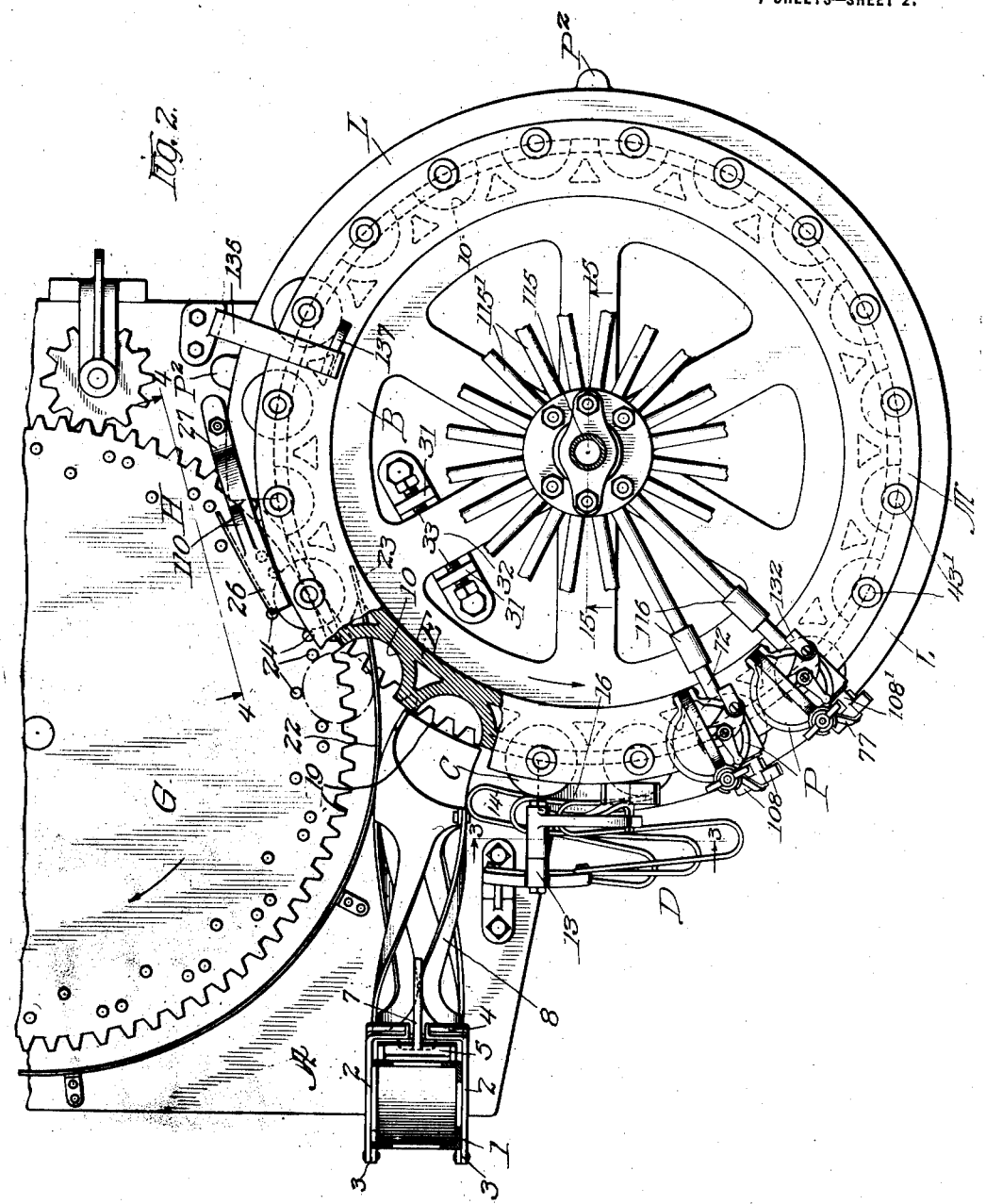

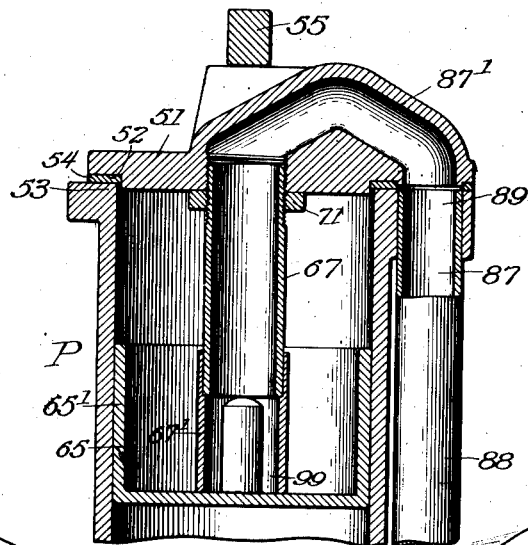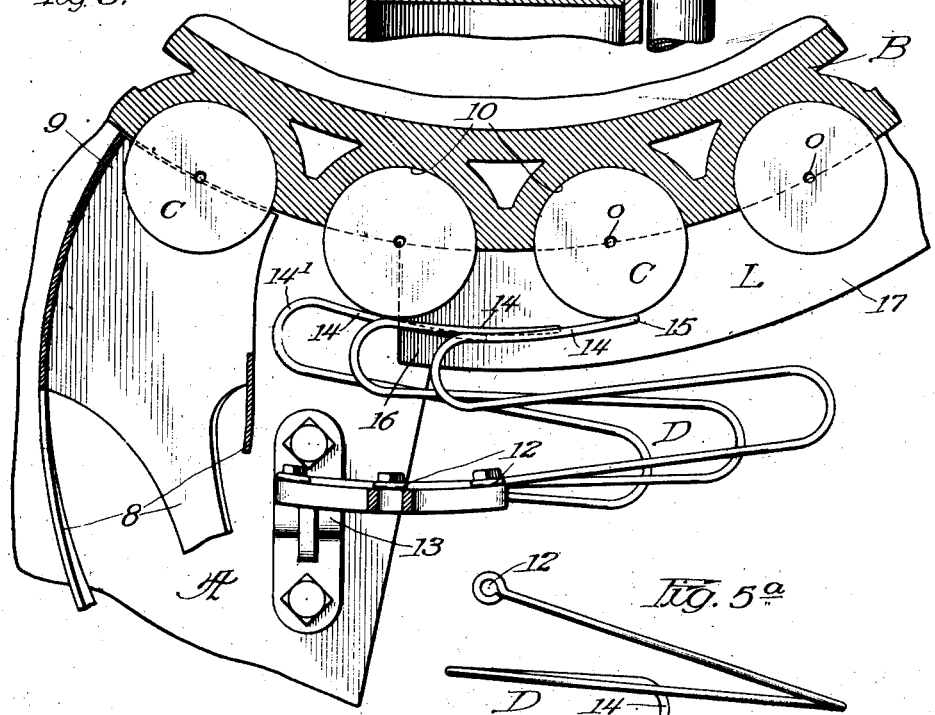

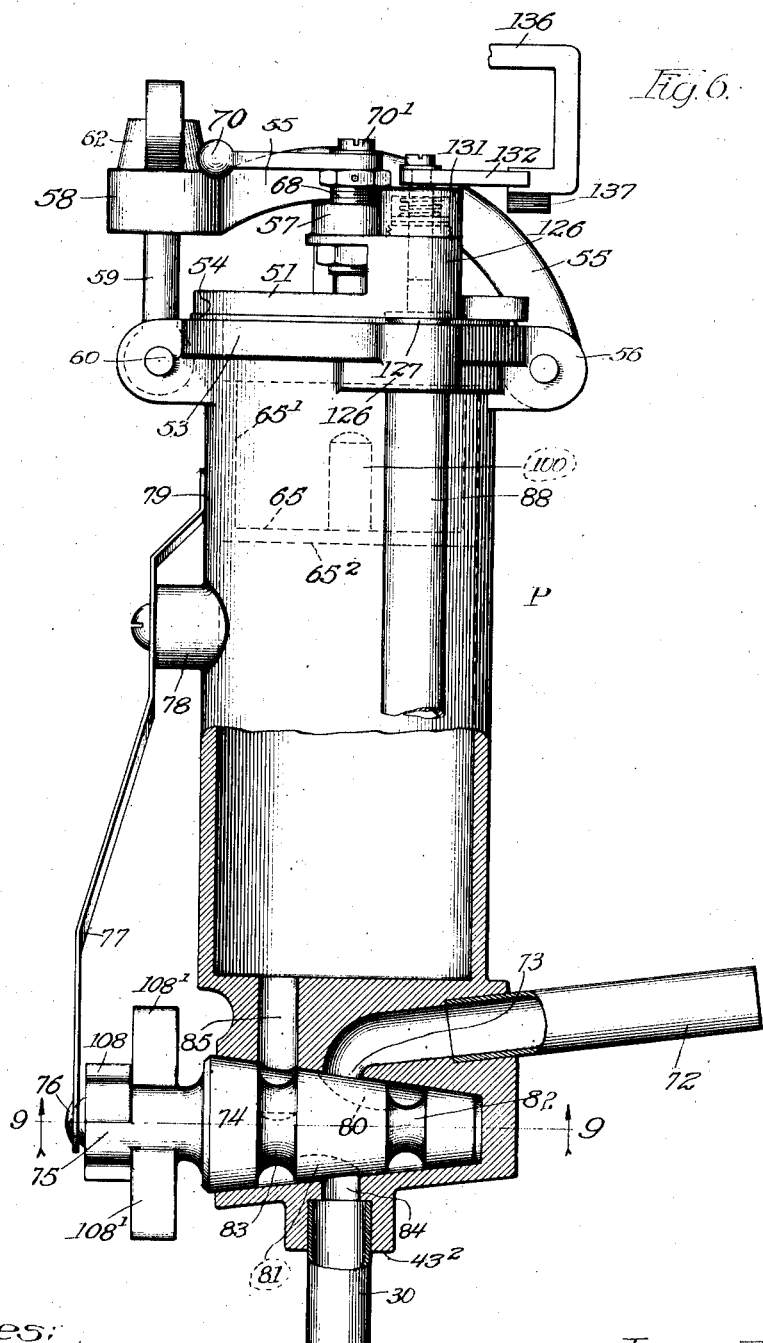

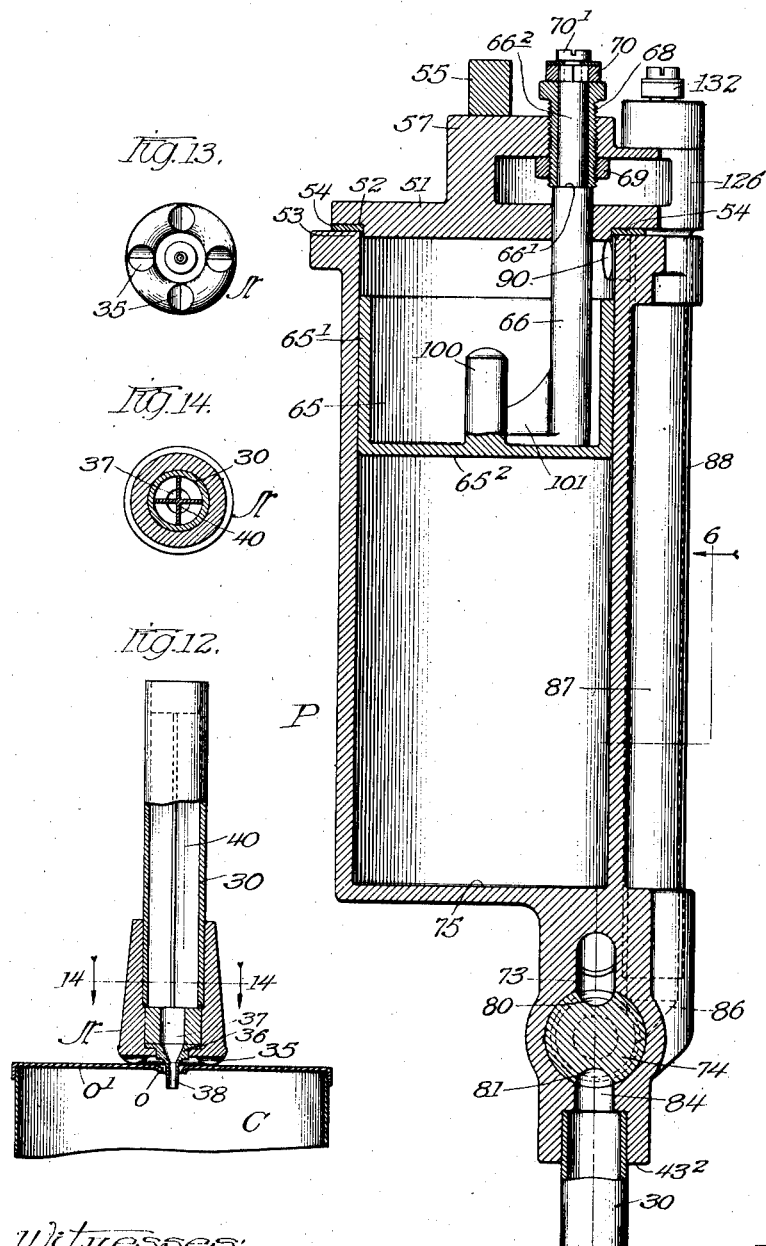

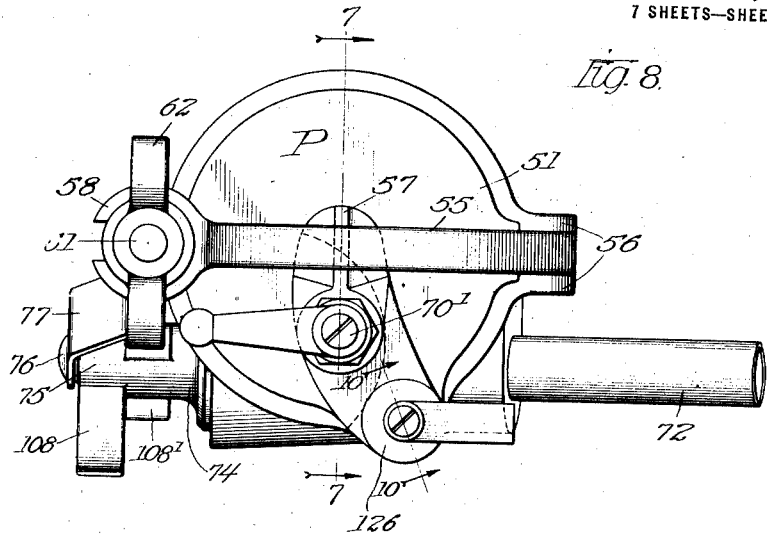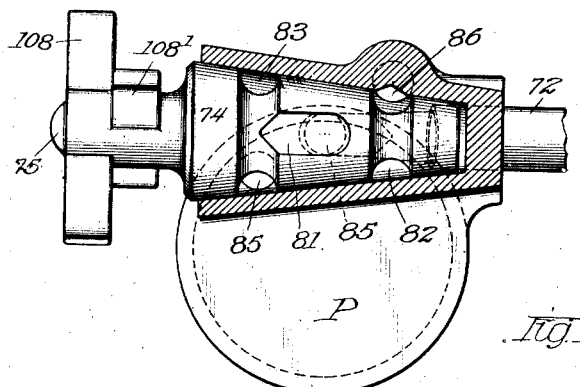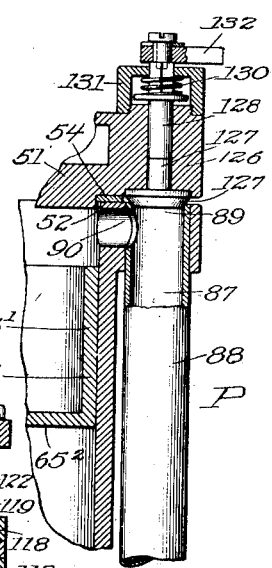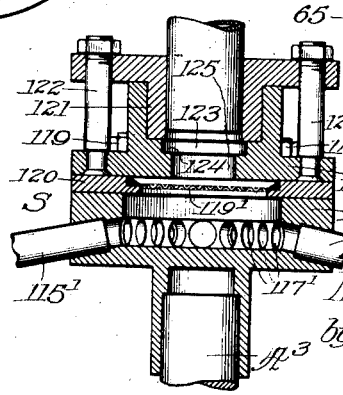

UNITED STATES PATENT OFFICE.

FRED G. DICKERSON, OF CHICAGO, ILLINOIS, ASSIGNOR TO THE F. G. DICKERSON COMPANY, OF PORTLAND, MAINE, A CORPORATION OF MAINE.

CAN-FILLING MACHINE.

1,365,773.     Specification of Letters Patent.     Patented Jan. 18, 1921.

Application filed July 1, 1912, Serial No. 706,855. Renewed June 9, 1920. Serial No. 387,723.

*To all whom it may concern:*

Be it known that I, FRED G. DICKERSON, a citizen of the United States, residing at Chicago, in the county of Cook and State of Illinois, have invented certain new and useful Improvements in Can-Filling Machines, of which the following is a specification.

My invention relates to machines for filling cans, bottles and other vessels with liquid, such as condensed milk, mixed paints, oils, and other commercial products for which such vessels or receptacles are used, and the terms "can" and "cans" are herein used as representative of the various kinds of vessels or receptacles used for liquid and semi-liquid commodities, and the terms "liquid," "liquids" and "milk" as representative of such products or commodities.

One of the objects of my invention is to provide an improved machine of this character which will be simple, durable and reliable in construction, and effective and efficient in operation.

A further object of my invention is to provide an improved can filling machine which will automatically fill the cans presented to it from a source of supply at a rapid and uniform rate consistent with the character of the cans and liquids for which the machine is used, and will discharge the filled cans in such manner that if desired they may be directly fed or presented to other machines, such as sealing machines.

A further object of my invention is to provide an improved can filling machine which will be continuous in operation and will handle a large number of cans in process of filling.

A further object of my invention is to provide an improved filling machine which will automatically measure and charge or inject the liquid into each can or vessel with extreme and uniform accuracy, and which will leave the vessel in such condition that the liquid will not interfere with the sealing operation.

A further object of my invention is to provide an improved unit or individual measuring and filling mechanism which will automatically measure a charge of liquid for a succeeding can or group of cans while filling a present can or group thereof with a pre-measured charge.

A further object of my invention is to provide an improved can filling machine which can be easily and conveniently disassembled and re-assembled by an ordinary workman for the purpose of flushing and cleaning the parts, particularly those parts and passages through which the liquid passes, whereby the machine may be kept in a sanitary condition, especially when used in handling condensed milk and cream, or such food products which must necessarily be cleanly handled.

A still further object of my invention is to provide an improved can filling machine which will charge or inject the liquid into the cans or vessels in such manner that it will not foam.

A still further object of my invention is to provide an improved can filling machine which can be readily regulated and adjusted for filling cans of various sizes, such as are used for commercially marketed quantities of liquid commodities.

Other objects of my invention will hereafter appear.

The above and other new and useful objects hereinafter appearing are accomplished by, and my invention consists in, the construction, combination and arrangement of the parts herein described and shown in the accompanying drawings, which illustrate one exemplification of my invention, and more particularly pointed out in the appended claims.

In the drawings—

Figure 1 is a view in elevation of a can filling machine embodying my invention.

Fig. 2 is a top plan view of the machine shown in Fig. 1.

Fig. 3 and Fig. 4 are enlarged fragmentary views in elevation illustrating the means for elevating the cans to and removing them from the filling nozzles of the machine, Fig. 4 being partly in section substantially on the line 4—4 of Fig. 2.

Fig. 5 is an enlarged fragmentary view, partly in section, of the mechanism for maintaining the cans in proper relation to the filling nozzles.

Fig. 5ª is a detail view of one of the maintenance springs.

Fig. 6 is an enlarged view, the lower part thereof being in section on line 6—6 of Fig. 7, of one of the individual or unit measuring and filling mechanisms.

Fig. 7 is a vertical section substantially on the line 7—7 of Fig. 8.

Fig. 8 is a plan view of the filling unit disclosed in Fig. 7.

Fig. 9 is a bottom plan section substantially on the line 9—9 of Fig. 6.

Fig. 10 is a fragmentary sectional detail view on an upper portion of the measuring mechanism, taken substantially on the line 10—10 of Fig. 8.

Fig. 11 is a vertical section of the upper portion of the unit measuring mechanism modified as more carefully explained hereinafter.

Fig. 12 is a central sectional view of the filling nozzle.

Fig. 13 is a bottom plan view thereof.

Fig. 14 is a transverse section on line 14—14 of Fig. 12, and

Fig. 15 is a vertical section of the manifold or supply box, on line 15—15, of Fig. 2.

In the drawings I have illustrated my invention as embodied in a machine designed more particularly for charging or filling covered cylindrical cans such as are used for condensed milk or cream, cans of this character usually being provided with a central opening in one end through which the milk is injected, and which is afterward hermetically sealed, and I will describe my invention with reference to the machine shown and used for this purpose; but it will be understood, however, by one skilled in the art after having obtained an understanding of my invention from the disclosures herein made, that my invention is equally as capable of being embodied in or applied to machines for handling other liquid or semi-liquid products or commodities and the various types of vessels used therefor. It will likewise be understood that the several combinations and arrangements of parts the functions of which are more fully explained hereafter, may be employed in other filling machines, either in their entirety or separately, for instance the unit measuring and filling mechanisms may be employed in connection with other means for presenting the cans to and removing them from said mechanisms; all without departing from the spirit and scope of my invention.

The machine shown in the drawings has a frame or bench composed principally of a suitably formed flat bed A, supported at a convenient height for the operator, upon legs or standards $A^1$. Upstanding from this in a suitable bearing $A^2$ is a vertical main shaft $A^3$ which constitutes the axis for various rotary parts of the machine, as hereinafter explained. At one side of the bench or table A is a standard $A^4$ which supports a can feeding chute 1, by which the cans C are fed or guided to the machine. This chute may lead from the source of supply of cans, such as a can forming machine located on the floor above or in any other place best adapted to operating conditions. The chute may be made of the proper form to accommodate the particular type of cans or vessels which the machine is intended to handle. In the drawings the chute is formed as an open work structure, so that the operator may observe the movement of the cans at any time. At a convenient point in the chute there may be provided a bail or yoke member 2, pivoted at 3, and having a curved tongue 4, adapted when the bail is dropped to the dotted position (Fig. 1) to be interposed in the path of the cans through the chute and stop the feeding of the cans. This stop member may be normally held in its upper or non-stopping position by means of a stirrup or latch 5, pivoted on the chute at 6 and having an extension 7 for tripping it when desired. This mechanism obviously may be operated by hand, or it may be operated automatically in the event that anything goes wrong with the machine. The lower portion $1^a$ of the chute curves horizontally and this portion of its walls 8 (Figs. 1 and 2) are given a quarter turn or twist. The purpose of this arrangement is to feed the cans, which come down the chute in a horizontal position, to the machine on end or in an upright position. The construction of these parts, however, is determined by operating and manufacturing conditions and by the character of the vessels to be filled. The inner end 9 of the chute lies close to the periphery of a horizontal rotary conveyer or carriage B mounted upon the central shaft $A^3$. This rotary carriage has a plurality of semi-circular cells or pockets 10 formed in and equally spaced around its periphery which successively receive the end cans of the series in the chute as the carriage rotates, the cans being fed in preferably by the weight or pressure of the series of cans in the chute. As each can C is fed into its cell, it is carried thereby upon a rotary table E disposed below the carriage B in the direction of the arrow (Fig. 2). As it leaves the chute it is engaged by a series of peculiarly formed springs D, which press upon the several adjacent cans and firmly and positively seat them in their respective cells during a portion of the arc in which they travel. Referring more particularly to Figs. 1, 2, 5 and $5^a$, it will be noted that this series of springs is composed of several (preferably three) individual spring members, made of spring rod or wire and bent into the peculiar flattened S-shape like that shown more particularly in Figs. 5 and $5^a$, giving them the proper resiliency. Each spring has two eyelet ends 12, which are bolted in a row upon a standard or supporting member 13 upstanding from the bench or table A of the machine. These springs have curved U- shaped portions 14, positioned to engage several of the cans C carried by the rotary conveyer. It will be noted that the curvature of the U-shaped portions 14 of the springs follows the curvature of the rotary member B, and these portions are overlapped, so to speak, in break-joint fashion, so as to present to the cans a continuous yielding surface extending over a certain arc of travel of the cans. Since each spring in the series, however, is independent of the others, it acts independently and firmly presses whichever can or cans happen to be in engagement with it at any instant. In this manner the can which engages the first spring 14¹ of the series after leaving the chute cannot effect the other springs, and relieve the pressure exerted thereby upon the next preceding cans. At the same time, however, the several cans which are engaged by the springs are all properly and uniformly held seated in their respective cells or pockets.

The cans after leaving the chute travel with the carriage B and table E a certain distance at what I term, for convenience, a lower or "feeding" level, which is formed by the surface of the table E, the table being of a diameter sufficient to support the cans on end. Before leaving the last end 15 of the series of spring members D, the cans successively ride up a cam or incline 16 (Figs. 3 and 5) to a higher or elevated level 17, which I term for convenience a "filling" level. This latter level is formed by the upper surface of a stationary platform L, which embraces the peripheral portion of the table E, which continues around through about three-quarters of the circumference thereof. The platform is mounted upon several threaded studs L¹ upstanding from the table A and screwing into the lugs P² for the purpose of raising and lowering the platform to accurately regulate the filling level 17. At about the point H the "filling" level 17 terminates in a drop or incline 18 (Fig. 4), down which the cans successively ride upon the rotary table E. After riding down this incline to the lower level the cans may be taken from the machine in any desired manner. In the drawings, however, I have illustrated a portion of a horizontally disposed rotary table G (Figs. 2 and 4), the surface of which is coincident with that of the table E. This table G represents a can carrying member or feeder for a sealing or capping machine. It rotates in the direction of the arrow (Fig. 2) and also serves as a driving member for the rotary member B. For the purpose of driving the rotary member B in unison with table G, the peripheries of both rotary tables E and G are formed as gears, the teeth 19 of which intermesh.

As the cans ride down the incline 18 at the point H in their travel, they are successively shunted off or deflected from the table E and conveyer B onto the rotary table G. This may be accomplished by means of a simple curved deflector bar or rail 22, the end 23 of which is positioned in the path of the moving cans (Fig. 2). In order that the cans may be maintained in the same successive relation as they leave the table, they are received in an annular series of cells or pockets which are formed by a plurality of upstanding pins 24 on the rotary table G. As it is essential that the cells of the rotary member B and those of the table G properly register during rotation in order that the cans may be properly transferred, I have arranged the parts so that the rotary table drives the conveyer B through the medium of an adjustable connection. Thus, in Fig. 2 it is observed that the rotary table E has two upstanding lugs or arms 31, positioned on opposite sides of one of the spokes 32 of the carriage B and spaced sufficiently apart to allow some play for the spoke between them. An adjusting bolt 33 is screwed horizontally through each of these arms into engagement with the spoke 32. Hence by manipulating these opposed bolts the rotary carriage B may be rotated relatively to the rotary table E a sufficient amount to properly "time" or register its can cells with those of the rotary table G. At the same time this arrangement forms a positive driving connection between the members B and E. After leaving the conveyer B the cans are maintained in position in the cells 24 by the curved guide or deflector 22 for as much of their travel with the table G as is necessary. A suitable guard 26 mounted upon a standard 27 upstanding from the bench A may be provided for preventing the displacement of the cans as they ride down the incline 18, and for assisting the deflector bar 22 in properly transferring the cans to their cells by the rotary table G.

The machine illustrated in the drawings, as before stated, is designed for handling condensed milk cans of a type provided with comparatively small filling openings or apertures O in the center of one head or end O¹ (Fig. 12). The filling nozzles N are constructed accordingly. The purpose of elevating the cans to the filling level, as before described, is to bring them into filling relation with the nozzles N, but this may be accomplished of course by lowering or moving the nozzles relatively to the cans. These nozzles are arranged in an annular series and are individual to the cells 10 of the rotary carriage B. They are removably mounted upon the ends of short tubes 30, and are centrally positioned above the cells 10, the tubes 30 being removably mounted vertically in suitable bearings or bosses 43¹ formed in an annular overhanging flange or rim M, preferably cast integral with the rotary conveyer B. The nozzles N are preferably made in the form of caps of rubber or other suitable material removably fitted on the lower ends of the tubes 30 to permit their removal for cleaning purposes. The lower ends of these caps contact with the upper heads or tops of the cans as the cans are elevated. They have a number of radial depressions or air outlets 35. In the lower portions of the caps small metallic plugs 36 are inserted, having central passages 37, and which terminate at their lower ends in small projecting tips 38. These tips enter the filling openings O in the tops of the cans, as clearly shown in Fig. 12. The tips are of less diameter than said openings, so that the air in the cans which is displaced by the milk or liquid entering the can through the tips may escape through the space formed by virtue of the difference in diameter between the can opening O and the tips 38. From thence the displaced air escapes through the outlets 35 to the atmosphere, and the parts are so proportioned that the displaced air may escape as fast as it is displaced. In order to cause the liquid to leave the nozzles in a direct compact stream and prevent foaming in the cans, I provide each tube with a member 40. This member 40 is loosely inserted in the end of the tube and is of sufficient length for the purpose. As shown in the drawings, it may be made of a thin piece or pieces of metal disposed at right angles and forming a cross in section, as shown in Fig. 14. These members virtually form a plurality of longitudinal partitions in the tubes, and their effect is to split or divide the flow of liquid through the tubes 30 into a corresponding number of direct smaller streams. This prevents the tendency of the milk or liquid to whirl within the tubes and nozzle passages. As the streams of milk leave the ends of the tubes 30 they combine or unite again in the passages 37 of the filling nozzles just prior to leaving the tips 38, and the upper portions of the passages 37 are enlarged to form mixing chambers, so to speak, for this purpose.

In the machine shown in the drawings I provide a number of measuring and filling mechanisms, the function of which is to control the quantity of milk which goes into the cans through the nozzles. I prefer to use one of these mechanisms per can to be filled, but I may, under certain conditions, arrange the structure so that each may control the filling of a number or group of cans. These mechanisms may be rotated or moved in any desired manner on the machine according to the particular conditions and requirements which the machine is designed to meet. In this machine I arrange them in an annular series. Figs. 1 and 2 show several of these units, the rest being omitted for the sake of clearness. They are positioned immediately above the can cells of the rotary conveyer B, in order that the milk after it leaves these mechanisms may pass by the most direct and shortest paths to the cans, the reasons for which will hereinafter appear. The simplest method of mounting these mechanisms is to secure them to the upper ends of the tubes 30 in such manner that each tube 30 may be removed with its controlling mechanism. At the point where the tubes 30 join the body of the measuring and filling mechanisms, I provide shoulders $43^2$ which rest upon the bearing bosses $43^1$, so that the tubes 30 and the nozzles N will project the given distance below the rim or flange M of the rotary carriage B. Each of these measuring and filling units P is made in the form of an elongated hollow cylindrical body casting open at its top and having a sufficient quantity of metal at its bottom to accommodate a reverser. In order that the interior of the cylinders may be accessible for flushing and cleaning purposes the upper end thereof may be closed by means of a cap or cover member 51, Figs. 6 and 7, having an annular shoulder 52 fitting the upper edge or rim 53 of the cylinder. This centers the cap and provides a tight joint. In addition to this a gasket 54 may be interposed between the cap and cylinder as a further precaution against leakage. The cap 51 may be held in position in any suitable manner found best adapted for the purpose. I prefer, however, to use a curved clamp member or arm 55 hinged at one end in lugs 56 at the side of the cylinder. This arm bridges or spans the cap and engages an upstanding portion 57 for the purpose of tightly seating the cap. The free end of the clamping arm 55 may be yoked or provided with an open ended slot 58 (Figs. 6, and 8) adapted to receive a bolt 59 which is hinged in lugs 60 on the opposite side of the cylinder. The free end 61 of this bolt may be threaded to receive a clamping nut 62 whereby sufficient clamping pressure may be obtained to hold the cap firmly in position. It will be seen that this arrangement provides a very convenient means of holding the cap in position and at the same time the cap may be readily removed whenever desired. The interior of each cylinder is divided or partitioned off, so to speak, into an upper and lower chamber, by means of a movable partition 65, which, as seen in the drawings, is fitted within the cylinder in such manner that it may freely move with the liquid and at the same time prevent any liquid from passing by it from one compartment to the other and further acts as a valve in that it, at predetermined points in its movement, acts as a closure for the means of communication to the compartments. I prefer to make the movable partition in the form of a cup having an annular side wall 65¹, and a flat bottom wall 65² for various reasons, one of which is to enable me to adjust the mechanism to different sizes of cans, as will appear hereinafter. However, it may be made solid, if desired. At the lower end of its stroke or range of movement in the cylinder, the movable partition strikes the bottom wall 75 of the cylinder. The upper end of its range of movement may be determined by a vertical gage rod 66, as shown in Fig. 7, or by means of a central tube 67, as illustrated in Fig. 11. It will be seen that although this arrangement forms in effect two chambers in the cylinder, the capacity of these chambers varies in accordance with the particular position of the movable partition 65 within the cylinder. In other words, as the movable partition 65 moves upward, the upper chamber will gradually decrease in capacity and the lower chamber will correspondingly increase in capacity, and vice versa. It is by means of this arrangement that the mechanism exactly measures a quantity of liquid for a succeeding can, while charging liquid into or filling a present can. In order that the quantity of liquid measured by each chamber may be regulated with extreme accuracy, I mount the gage 66 (Fig. 7) or the tube 67 (Fig. 11), as the case may be, in such manner that they may be longitudinally adjusted and set. In Fig. 7 it will be seen that the upstanding portion 57 of the cap member carries a threaded sleeve 68 provided with a lock nut 69, so that it may be vertically adjusted, as required. The gage 66 is confined against vertical movement in this sleeve by the shoulder 66¹ on its reduced upper end portion 66², and a lever or arm 70, the lever being removably fastened on the end of the gage rod, by means of a screw 70¹. This enables the gage 66 to be rotated on its axis in any position at which it has been vertically adjusted by means of the threaded sleeve 68. Any suitable mechanism other than that just described may be used to accomplish these results; for instance, as shown in Fig. 11, the tube 67 may be threaded into the central portion of the cap whereby it may be vertically adjusted, and it may have a lock nut 71 for setting it in its adjusted position. In the structure shown, the liquid is supplied to the mechanism through a tube 72, which enters the lower portion of the cylindrical or body casting and terminates in a port or passage 73, opening into communication with a reverser member 74. This reverser member is seated in a chamber or socket formed in the lower portion of the casting in such manner that it may be rotated. It will be noted that both the reverser member and its seat are considerably tapered so as not only to take up the wear and fit properly, but that it may be conveniently and easily removed for flushing and cleaning the various passages accessible therefrom. The reverser has a round-ended, central projection 75 against which the dished-end 76 of a leaf spring 77 presses to maintain the reverser in its seat, and at the same time allow it to be rotated. The pressure spring is pivoted on a boss 78 projecting from the cylinder so that it may be swung away from the reverser to permit the removal thereof. The upper end 79 of the spring engages the cylinder and provides a yielding spring lock to hold the spring in place. The reverser has two grooves or passages 80 and 81 formed on opposite sides thereof. These grooves or passages communicate with peripheral or annular grooves 82 and 83, respectively, formed in the reverser member 74 and spaced apart thereon. As shown in Fig. 6, the inlet port 73 and the outlet port 84 leading to the tube 30, are so arranged that they communicate with the rotary reverser at diametrically opposite points in such manner that the grooves 80 and 81 register therewith. In other words, the groove 80, when the reverser is in the position shown in Fig. 6, registers with the inlet port 73 and connects that port with the annular groove 82, and the groove 81 connects the outlet port 84 with the groove 83. When, however, the reverser is rotated a half turn, these conditions are reversed and the groove 81 connects the inlet port 73 with the groove 83, while the groove 80 connects the outlet port 84 with the groove 82. In this manner the reversing member controls the direction of flow of liquid through the mechanism, depending upon its position, as just described. I will now proceed to describe the manner in which the liquid is conveyed to and from the upper and lower chambers of the cylinder. In the drawings it will be seen that there is a port 85 in the lower end of the cylinder which registers with, and connects the lower chamber at all times with, the annular groove 83. In like manner, the upper chamber of the cylinder is connected at all times with the groove 82 through a port 86 (Figs. 7 and 9), and through duct 87, which is formed by a tube 88 passing upward along the outside of the cylinder and terminating in an open upper end 89 (Fig. 10). The upper end of the duct 87 opens into the upper chamber immediately below the cap through a lateral port 90. In Fig. 11 it will be observed that instead of using the port 90, the duct 87 may continue on through a duct or passage 87¹ formed in the cap. This latter duct connects the upper end 89 of the duct 87 with the upper end of the tube 67, and in this manner communication is established with the upper chamber of the cylinder through the lower end of the tube 67, for purposes to be more fully explained hereinafter.

The liquid may be fed to the measuring and filling units at whatever pressure may be found to be best adaptable to the particular requirements and conditions. Other things being the same, the speed at which the cans are filled depends upon the degree of pressure applied to the liquid. In the case of condensed milk, I find in practice that with the structure shown in the drawings, the most satisfactory results are obtained by supplying the milk to the mechanism at about from four to five pounds pressure. The milk is supplied to the mechanisms through their tubes 72 and ports 73 at substantially this pressure. Assuming that the reverser has just been turned to the position shown more clearly in Fig. 6, it will then direct the flow of milk from the intake port through the passages of the reverser, and the duct or passage to the upper chamber of the mechanism, as above explained, and being under pressure will gradually fill the upper chamber with an exact predetermined quantity of liquid by forcing the movable partition 65 downwardly to the bottom of the cylinder. As the movable partition moves downwardly, it gradually and proportionately decreases the capacity of the lower chamber and forces the previously measured quantity of liquid in the lower chamber through several ports and passages and into the can through nozzle N. After the pre-measured quantity of milk from the lower chamber has thus been injected or charged into the can, the movable partition positively closes the outlet port 85 at the lower end of its stroke and no milk can pass through the mechanism until the direction of flow is reversed by giving the reversing member 74 a half turn. When the reverser is thus rotated, it connects the inlet port 73 directly with the lower chamber of the cylinder and connects the upper chamber of the cylinder with the outlet port 84 and nozzle N. This causes the movable partition 65 to rise in the cylinder, thus gradually filling the lower chamber and simultaneously forcing the pre-measured quantity of milk from the upper chamber into the next or succeeding can which has been connected with the nozzle. In the structure shown in Fig. 6 the movable partition 65 does not actually cover the upper port 90 as it does the lower port 85, but its movement is positively stopped by the gage 66, which has identically the same effect as though it did actually close the port 90. This is obvious, for the reason that although there is a quantity of liquid still left in the upper chamber above and in the movable partition itself, the gage rod 66 positively prevents any pressure whatever being applied to this remaining quantity, and in consequence it will not flow through the port 90. Thus the quantity of liquid which the upper chamber pre-measures is represented by the difference between the quantity of liquid in the upper chamber when the movable partition 65 is in its lowest position and that remaining in the upper chamber after said movable partition has reached its upper limit of movement against the gage rod. In Fig. 11, however, I have arranged the structure so that the movable partition positively and directly closes the upper port as it does the lower port, which structure I adopt when the nature of the particular liquid renders it advisable to do so. In this structure it will be observed that the lower open end 99 of the tube 67 represents the port 90, and is positioned so that the movable partition 65 will cover and positively close said end. It will be remembered from the preceding description that the tube 67 is longitudinally adjustable, hence it serves the same purpose as the gage rod 66, so far as regulation is concerned. As before intimated, I construct these measuring and filling mechanisms in this manner so that they may be adjusted to the filling of two different sizes of cans or vessels. In Fig. 6 this may be accomplished in a simple manner, such as by means of a central upstanding stud or projection 100, and the gage rod 66. The upstanding stud 100 is preferably integrally formed with the floating valve 65, and the length or height of this stud exactly represents the difference between the two sizes of cans to be filled. On the lower end of the gage rod I form a lateral extension or foot 101 which, by the rotation of the gage as previously described, may be interposed in the path of the stud 100 and thus stop the movable partition in a lower position. Obviously a lesser quantity of milk or liquid will be forced from the upper chamber and a proportionately lesser amount will enter the lower chamber. In this manner a smaller can may be filled. In the structure shown in Fig. 11, the same results may be accomplished by making the tube 67 in two sections, the lower section 67¹ of which may be removable and may represent the exact difference in the two sizes of cans. In this figure I have shown the section 67¹ in position and the mechanism thereby adjusted for the smaller can. By removing said section, however, it is obvious that the mechanism may be instantly set or adjusted to fill large size cans. For the sake of simplicity, I have illustrated the mechanism adjustable to two sizes of cans only, but it is clearly obvious that the range of sizes may be increased by providing, in the structure of Fig. 7, a corresponding number of different length studs 100, or, in the structure of Fig.

11, by making the tube 67 with a corresponding number of removable sections of different lengths. If desired, other means for accomplishing these results may be used, and I do not wish to be limited to the particular structures shown.

As I have previously described, the cans are successively elevated to the filling level 17 shortly after leaving the feeding chute. The elevating of the cans in this manner causes the nozzle tips 38 (Figs. 1, 2, 3, 4 and 12) to enter the filling openings O in the cans. In order to avoid loss of time in the process of filling, I arrange the parts so that the reverser 74 will be actuated shortly after the cans rise to their filling position, and the nozzles enter them. I prefer that the actuation of this reverser be controlled by the movement of the cans themselves, and for this reason I pivot an arm 105 upon the stationary standard 13 (Figs. 1, 2 and 3). This arm has a hooked end 106, and it also has an angularly disposed V-shaped cam extension 107 disposed in such manner as to ride upon the heads or tops of the cans as they are moved in their annular path. These parts are so proportioned that when the cam extension 107 rides up on the moving cans, it will project the hooked end 106 of the arm into the path of snubs 108 formed on the projecting end portions 75 of the reversers and successively actuate said reversers. I have so proportioned the parts of the machine shown in the drawings that the filling process will occupy about the time consumed by the rotary conveyer B in making about three-fourths of a revolution. As before intimated, the movable partitions 65 are arranged to close the upper or lower ports of their filling mechanisms, as the case may be, shortly before the cans reach the incline 18, positioned at the point H. The filling of the cans will be thus completed and in readiness to be disconnected from the nozzles when they reach the incline 18. Since the reversing members do not close and open the ports in the cylinder but instead merely control the direction of the flow of the liquid through the mechanisms, it is obvious that they may be actuated at any point in the revolution of the rotary conveyer B. For this reason and for the sake of simplicity, I prefer to so arrange them that each half or flow-reversing turn thereof will be accomplished in two steps of a quarter turn each. For this reason I provide a projection or lug 110 on the guard standard 27 (Fig. 4). This is positioned to be engaged by two other snubs 108¹, also formed on each reversing member 74. The two snubs 108¹, like the snubs 108, are arranged in alinement but are disposed at right angles to the snubs 108 (Figs. 6, 8 and 9). They also lie in a plane offset with respect to the plane of the snubs 108, so that the snubs 108 only engage the automatic actuating lever 105 and the snubs 108¹ only engage the lug 110. The advantage of offsetting the two sets of snubs in this manner lies in the fact that the actuating member 105 will always complete the reversing half turn of the member 74 shortly after the cans enter the machine, thus insuring against the possibility of dead centering the reversers at the point where the cans are connected to the nozzles.

The liquid may be supplied to the measuring and filling units in any manner found to be most convenient and satisfactory according to the particular operating conditions. In the structure shown in the drawings, however, I have illustrated a simple and convenient method for supplying milk to the mechanisms from a source of supply. Referring more particularly to Figs. 1, 2 and 15, it will be seen that the main supply pipe 115 enters from above a circular or short cylindrical box or manifold S, centrally mounted upon and rotatable with the main shaft A³ of the machine. This manifold has a plurality of individual radially disposed supply pipes 115¹ downwardly inclined and connected to the ends of the short inlet pipes 72 of the measuring and filling units. These pipes are preferably of the same diameter as the pipes 72, and they may be connected therewith by means of short pieces of rubber or flexible tubing 116, slipped over the adjacent ends of the pipes. This arrangement enables any of the measuring and filling units to be disconnected independently of the remaining mechanisms by simply sliding the tube along either the tube 72 or the supply pipe 115¹, in order to separate the connected ends thereof. This arrangement also has the advantage that both the supply pipes 115¹ and the inlet tubes 72 of the mechanisms are readily accessible for flushing and cleaning purposes. The central supply manifold is sufficiently large to properly divide the main stream of liquid from the supply pipe 115 into the various individual streams for the individual supply pipes 115¹. It is preferably made in two sections 117 and 118 clamped together by a series of bolts 119. The lower section is hollow and has the individual feed outlets 117¹, and the upper section serves as a cover therefor. I interpose between the two sections a screen member 119¹ of suitable mesh for the purpose of preventing any metallic or other solid substances from passing into the supply pipes and into the measuring and filling mechanisms. This screening member may be for the sake of strength and rigidity mounted in a ring shaped member or frame 120, as clearly shown in the drawings. In order that the main supply pipe 115 may remain stationary while the manifold rotates, I provide the cover section 118 with a socket into which a sleeve 121 is seated and removably held by a series of bolts 122. The lower end of the supply pipe has a flange or collar 123 which is seated between the end of the sleeve 121 and a shoulder or annular groove 124 in the cover section, thus forming a non-leakable joint which may be packed, if desired. The cover section has a suitable opening 125 through which the liquid passes from the supply pipe to the interior of the manifold.

In a machine of this character designed to fill cans or other vessels which are afterward sealed by soldering or sealing the openings thereof, it is quite essential that none of the liquid slop over onto the tops of the cans or drip thereon from the filling nozzles, since this would make the sealing difficult. In this machine no trouble is experienced on this account in connection with the liquid charged into the cans from the lower chambers of the measuring and filling mechanisms, for the reason that as previously explained, the floating member 65 actually covers the port 85 at the end of its down stroke. In the case of liquid charged into the cans from the upper chamber or compartment, however, there is some likelihood in practice of a drop forming at the end of the nozzle after the floating valve has been stopped on its up stroke by the gage 66 on account of the fact that an extremely small quantity of liquid oozes past the floating valve member 65 from the lower compartment and enters the upper compartment. The effect of this slight leakage in forming a "last" drop at the nozzle exits only in the mechanism shown in Figs. 6, 7, 8 and 10, the reason being that the floating member does not actually cover the port 90. In order, therefore, to avoid the possibility of a last drop accumulating at the nozzle, I provide a mechanism which imparts a slight hammer blow, so to speak, to this remaining column of liquid in the passages leading from the upper compartment, the effect being to "knock" off the drop at the nozzle. It is manifest that this condition does not exist in the structure shown in Fig. 11 since the floating member as before explained, actually covers the port 99 at the lower end of tube 67. Referring to Figs. 6, 7, 8 and 10, it will be remembered that the upper end of the tube 88 is open. The cap member 51 has an integral offset portion 126 overhanging the open end of the tube 88. This offset portion carries a small resilient cap 127, which covers the end of the tube. This cap 127 has a small plug 127¹, which sets into a vertical bore or bearing in the offset portion 126 and above this plug is a small hammer rod 128 which is normally held against the end of the plug by spring member 130. This spring member is maintained in position by means of a hollow screw cap 131, shown more particularly in Fig. 10. The hammer 128 passes upward through this screw cap and carries a laterally extending arm 132, by which it may be raised against the tension of its spring. Upstanding from the frame or bench A of the machine is a standard 135, the upper end portion 136 of which is formed, as shown more clearly in Fig. 1, to overhang the measuring and filling mechanisms. A cam or incline 137 is formed on this upper end portion of the standard, and is positioned in the path of the arms 132 in such manner that as the mechanisms pass the standard, these arms ride up on the cam 137 and then ride off suddenly. As they ride off the cam 137 their springs 130 impart a sudden blow to the columns of liquid in the ducts 87 and connecting passages. These sudden hammer blows cause the forming or formed drops to leave the nozzle tips. The cam 137 on the standard 135 is so positioned that the knocking off of the excess drop occurs just after the floating member 65 has been stopped by the gage rod 66 and before the cans are disconnected from the nozzles.

What I claim as new is:—

1. In a machine of the character described, the combination of an individual vessel propelling mechanism adapted to impart movement to the vessels to be filled, in successive order, with a series of traveling filling units connected to a source of liquid supply and each unit having two compartments for simultaneously measuring and discharging quantities of liquid, and reversible valve mechanism automatically controlled by the moving vessels for directing the liquid from the source into one of the filler compartments and simultaneously directing the liquid from the other of said compartments into said vessels while moving.

2. In a machine of the class described, a vessel conveying mechanism, in combination with a series of measuring and filling units connected to a source of liquid supply and said units being each provided with two chambers, said chambers being adapted to fill and discharge alternately, reversing valves controlled by the moving vessels to be filled for causing each measuring and filling unit to discharge a predetermined quantity of liquid from one of its chambers, and simultaneously fill its remaining chamber.

3. In a machine of the character described, a vessel carrying mechanism, in combination with a plurality of measuring units, each unit being connected to a source of liquid supply and arranged to discharge a predetermined quantity of said liquid and simultaneously measure a similar quantity thereof, means for bringing a vessel into operative relation with each measuring unit to receive the discharging liquid therefrom, and valve means under the control of the vessels to direct the flow of liquid to and from the measuring units aforesaid.

4. In a machine of the character described, a vessel carrying mechanism, in combination with a plurality of measuring units, each of said units being connected to a source of liquid supply and adapted to discharge a predetermined quantity of said liquid and at the same time measure a like quantity thereof, means for bringing a vessel into operative relation to each unit to receive the discharging liquid therefrom, and an automatic reversing device, controlled by the vessels for reversing the flow of the liquid to and from the measuring units aforesaid.

5. The combination with a carrier or conveyer, provided with means for receiving and conveying vessels, of a plurality of measuring and filling units, each unit being constructed to simultaneously measure and discharge separate predetermined quantities of said liquid, and means for controlling the operation of the filling and measuring units dependent upon the passage of the vessels aforesaid through the machine.

6. The combination with a carrier for vessels, of a plurality of filling and measuring units, each unit being connected to a source of liquid supply and constructed to simultaneously measure and discharge separate quantities of liquid, and means coöperating with said carrier for controlling the operation of said units.

7. In a machine of the class described, a vessel carrying mechanism and a plurality of individual liquid measuring devices, each connected to a source of liquid supply and each arranged for simultaneously measuring and discharging separate quantities of liquid, in combination with mechanism under the control of the moving vessels for periodically causing said measuring devices to discharge their measured quantities of liquid into vessels while measuring other quantities.

8. The combination with a carrying table for vessels, of a plurality of measuring units connected to a source of liquid supply, and each unit being arranged to simultaneously measure and discharge separate quantities of liquid, means under the control of the movement of the carrying table for controlling the measuring units to alternately reverse the direction of flow of the liquid to and from said units, and automatic means for bringing vessels into and out of operative relation to said measuring units for receiving a predetermined quantity of liquid therefrom.

9. In a continuous vessel filling machine of the class described, the combination of a plurality of traveling unit measuring devices each connected to a source of liquid supply and each arranged to pre-measure a quantity of liquid and simultaneously discharge a separate pre-measured quantity thereof, mechanism for moving the vessels to be filled in unison with said measuring devices and automatically connecting said vessels with said measuring devices, and means for periodically controlling the operation of each individual measuring device.

10. In a continuous vessel filling machine of the class described, the combination of a plurality of traveling unit measuring devices each connected to a source of liquid supply and each arranged to pre-measure a quantity of liquid and simultaneously discharge a separate pre-measured quantity thereof, mechanism for moving the vessels to be filled in unison with said measuring devices, and automatically connecting said vessels with said measuring devices, and automatic mechanism individually controlled by each vessel for periodically controlling said measuring devices to start the flow of liquid therefrom into the vessels.

11. In a machine of the character described, the combination with a rotary series of measuring units individually connected to a source of liquid supply and each unit being arranged to measure a quantity of liquid while discharging a pre-measured quantity thereof, a conveyer adapted to present vessels to said measuring units, and means operative after the vessels are presented to the units for automatically controlling the flow of liquid to and from said units, thereby causing the operation thereof.

12. In a machine of the character described, the combination with a rotary series of semi-liquid operated measuring and filling units connected to a source of liquid supply, and each arranged to measure a quantity of liquid while discharging a pre-measured quantity thereof, of a conveyer adapted to present vessels to said units, valves under the control of the movement of said conveyer for controlling the liquid flow to and from said units, and means for removing vessels from the conveyer and their operative relation to the units after the completion of the filling operation.

13. The combination with a rotary series of measuring and filling units connected to a source of liquid supply and each arranged to measure a quantity of liquid while discharging a like quantity thereof, of a rotary conveyer adapted to propel vessels in unison with the measuring and filling units, means for bringing each vessel into coöperative position with its corresponding measuring and filling unit, and means individual to each unit and under the control of the movement of the conveyer aforesaid for regulating the operation of its measuring and filling unit.

14. The combination with a rotary series of measuring units connected individually to a source of liquid supply and each arranged to measure a quantity of liquid while discharging a like quantity thereof, of a rotary conveyer adapted to propel vessels in unison with said measuring units, means for successively establishing communication between the vessels and the corresponding measuring units, and mechanisms individual to each unit for controlling the liquid flow to and from said unit thereby regulating the operation thereof after the establishment of communication with a vessel.

15. In a continuous vessel filling machine of the class described, the combination of a rotary vessel conveyer adapted to receive and carry the vessels to be filled in successive order, in combination with a series of measuring and filling devices, each connected to a source of liquid supply and each arranged to measure a quantity of liquid while discharging a pre-measured quantity thereof, mechanism for successively elevating the vessels into filling relation to said measuring devices at a given point in their rotary travel, and a device operable by each vessel after being elevated for bringing the measuring device into operation.

16. In a continuous vessel filling machine of the class described, the combination of a rotary vessel conveyer having a plurality of liquid measuring devices mounted thereon and rotating therewith, each device having means for discharging a pre-measured quantity of liquid into a vessel and for simultaneously measuring another quantity of liquid, means for stopping the flow of liquid therefrom after discharging said pre-measured quantity of liquid, and an automatic control device successively operated by each moving vessel as it passes said control device for starting the flow of said pre-measured quantity of liquid.

17. The combination with a rotary vessel conveyer, of a series of measuring and filling units arranged to rotate in unison with said conveyer, each unit including means for discharging a pre-measured quantity of liquid into a vessel and simultaneously measure a like quantity thereof, means for stopping the flow of liquid from each unit after the cessation of the discharging operation, a control device operated by each vessel as it passes thereby for starting the discharge of each unit, and means for breaking communication between each vessel and its corresponding unit after the discharge of a predetermined quantity of liquid by the latter.

18. In a continuous can filling machine of the class described, a rotary conveyer having a series of can-receiving cells, a series of individual measuring and filling devices mounted thereon above each cell and each connected to a source of liquid supply and adapted to pre-measure the required quantity of liquid for the can to be filled, means operated by the incoming liquid for discharging a pre-measured quantity, a nozzle for each measuring device, and automatic means operable during the travel of the cans for successively elevating the cans into filling relation to said nozzles at a given point in their travel.

19. The combination with a rotary conveyer provided with a series of can receiving pockets, of a series of measuring and filling units coöperating therewith, one unit for each pocket, each unit being connected to a source of liquid supply and adapted to receive and measure the liquid required to fill a can, means individual to each unit and under the control of the incoming liquid for discharging the pre-measured liquid, a nozzle communicating with each measuring unit, means for successively bringing the cans into filling relation to said nozzles, and means for successively removing the cans from filling relation to said nozzles after having received a pre-measured charge of liquid.

20. The combination with a rotary conveyer provided with a series of can receiving pockets, of a series of measuring and filling units, one coöperating with each pocket, each unit being connected to a source of liquid supply and adapted to receive and measure the liquid required to fill a can, means under the control of the incoming liquid for discharging the pre-measured liquid, a nozzle in communication with each unit, means for successively bringing the cans into filling positions with respect to the nozzles, means for successively removing the cans from filling positions with respect to said nozzles after having received a pre-measured charge of liquid, and means operable after each can is in its filling position for controlling the flow of liquid to the corresponding unit to cause the operation thereof.

21. In a machine of the character described, the combination with a rotary conveyer having a peripheral series of can receiving pockets, of a plurality of measuring units, one unit corresponding to each pocket, and each unit being arranged to receive and measure the quantity of liquid required to fill a can, means individual to each unit and under the control of the incoming liquid for discharging a pre-measured quantity of liquid, a nozzle for each unit, means positioned at a given point in the travel of the cans for bringing them into filling positions with respect to said nozzles, and automatic means adapted to be actuated by each can when in filling position for governing the flow of liquid in the coöperating unit.

22. The combination with a continuously operable conveyer adapted to receive and convey vessels to be filled, of a plurality of independent filling units coöperating continuously therewith and during a portion of the operation arranged to communicate with the vessels to be filled, and means individual to each unit for measuring a quantity of liquid for a succeeding vessel while discharging a pre-measured quantity of liquid into a present vessel.

23. The combination with a continuously operable rotary conveyer adapted to receive and convey vessels to be filled in a successive rotary order, of a plurality of independent measuring and filling units continuously coöperating therewith and arranged to communicate with the vessels to be filled during a pre-determined period of the operation, and means under the successive control of the moving vessels for governing each unit to measure a quantity of liquid for a succeeding vessel while discharging a like quantity of liquid into a present vessel.

24. The combination with a series of measuring units connected to a source of liquid supply and each unit having a plurality of chambers, means for controlling the direction of liquid flow thereby causing the liquid to enter one of said chambers, means controlled by the incoming liquid for simultaneously forcing a pre-measured quantity of liquid from the remaining chamber, a conveyer for presenting vessels to said measuring units, and an automatic means for periodically bringing unfilled vessels into coöperation with the measuring units aforesaid.

25. In a machine of the character described, the combination with a rotary series of measuring units each connected to a source of liquid supply and each having double measuring means, mechanism individual to each unit and common to said measuring means, operated by the entering liquid, for ejecting a pre-measured quantity of liquid, automatic mechanism for controlling the flow of liquid to and from said double measuring means, and a conveyer operating in unison with said units for periodically connecting unfilled vessels with the units aforesaid.

26. In a continuous filling machine of the class described, the combination of a series of unit measuring devices, each connected to a source of liquid supply and each having double measuring means, reversing mechanism under the control of the vessels to be filled for causing each measuring means to alternately measure and discharge quantities of liquid, and a conveyer for presenting the vessels to said measuring devices.

27. In a continuous filling machine of the class described, the combination of a moving series of unit measuring devices, each connected to a source of liquid supply, and each embodying two compartments for measuring independent quantities of liquid, and automatic mechanism for causing a quantity of liquid to enter one of said compartments while the pre-measured quantity is leaving the other compartment, conveyer mechanism for propelling the vessels in unison with said measuring devices, and means for individually connecting the vessels to said measuring devices prior to the operation of said automatic mechanism.

28. The combination with a rotary conveyer having a peripheral series of vessel receiving pockets, filling nozzles positioned adjacent to said pockets and adapted to engage vessels in the latter, means for successively feeding vessels to said conveyer, a plurality of independent springs for individually engaging each vessel and holding it in its respective pocket until engaged by its coöperating nozzle.

29. The combination with a rotary conveyer having a peripheral series of vessel receiving pockets, of vessel filling nozzles positioned adjacent said pockets, means for successively feeding vessels to said conveyer, and a plurality of springs positioned with one end of each spring overlapping an end of the next adjacent spring, said springs independently pressing on each can as the latter passes traveling with said conveyer.

30. In a vessel filling machine of the class described, the combination of a rotary conveyer having a peripheral series of vessel receiving cells, filling nozzles positioned adjacent said cells and adapted to engage vessels in the latter, means for successively feeding vessels to said conveyer, and a plurality of independent springs independently pressing on the vessels holding the latter in said holders until engaged by the nozzles.

31. The combination with a conveyer adapted to receive and carry articles, of means operable with said conveyer for retaining the articles thereon, and a plurality of independently operable elements arranged to present a continuous surface to the conveyer aforesaid for retaining the articles prior to engagement by said means, said elements overlapping so that each element engages an article prior to the release thereof by the preceding element.

32. A seating device comprising a series of overlapping yieldable elements.

33. A seating device comprising a series of overlapping yieldable elements creating a continuous surface at their free ends.

34. A seating device comprising a series of overlapping springs.

35. The combination with a conveyer having a series of vessel receiving pockets, of a stationary platform coöperating therewith, having an upward incline at one end terminating in the level of the body of the platform, a feed for delivering vessels to the pockets of the conveyer, said vessels being transported by said conveyer from said feed, up the incline to the level of the body of said platform, means for retaining the vessels in their respective pockets when traveling upon the body of the platform, and spring means for retaining the vessels in their respective pockets before reaching the level of the body of said platform, comprising a plurality of independent overlapping spring members presenting a continuous yielding surface to the path of travel of the vessels.

36. In a continuous filling machine of the class described, a rotary conveyer adapted to successively receive vessels to be filled, carry them through a given arc of travel, and discharge them, in combination with a plurality of unit liquid measuring devices, each connected to a source of liquid supply and adapted to be periodically connected to said vessels, and each device having its mechanism arranged to measure a quantity of liquid for a succeeding vessel while it is filling the vessel with which it is connected.

37. In a continuous filling machine of the class described, a rotary conveyer adapted to successively receive vessels to be filled, carry them through a given arc of travel, and discharge them, in combination with a plurality of unit liquid measuring devices, each connected to a source of liquid supply and adapted to be periodically connected to said vessels, and each device having an automatic controller arranged to measure a quantity of liquid for a succeeding vessel while it is filling the vessel with which it is connected, and automatic mechanism operable when an unfilled vessel is connected to said device for reversing the action of said controller.

38. The combination with a rotary carrier having a series of can receiving pockets therein, of a series of nozzles, one nozzle for each pocket, arranged to enter the cans and secure the same within the pockets aforesaid after being fed thereto, and a series of overlapping independently operable springs arranged to successively engage the cans and seat them in said pockets, maintaining them therein until engaged by the nozzles aforesaid.

39. The combination with a rotary carrier having a series of can receiving pockets therein, of a series of nozzles, one nozzle for each pocket, arranged to enter the cans and secure the same within the pockets aforesaid after being fed thereto, and a series of overlapping S-springs each spring having one end fixed, the free ends of said springs overlapping and presenting a continuous resilient surface to the cans fed to the carrier aforesaid.

40. The combination with a rotary carrier provided with a series of can receiving pockets, of a series of S-springs, each spring having one end thereof fixed, the free ends of said springs overlapping and presenting a continuous flexible surface to the carrier aforesaid whereby cans fed to said carrier may be seated in the pockets thereof and so held.

41. The combination with a shaft, of a table mounted thereon, a conveyer mounted on said shaft and superposed above said table and having a plurality of peripheral pockets, and means for relatively adjusting said table and conveyer.

42. The combination with a shaft, of a table mounted thereon, a conveyer mounted upon said shaft, and an adjustable connection between said conveyer and said table whereby the table and conveyer may operate in unison.

43. The combination with a shaft, of a table mounted thereon, a conveyer mounted on said shaft and provided with a series of can receiving pockets, a series of filling units, one unit for each pocket, said units adapted to travel with the conveyer aforesaid, and means for adjustably connecting the conveyer with the table aforesaid whereby the table and conveyer may operate in unison and at the same time provide an adjustment between said table and conveyer.

44. The combination with a rotary shaft, of a table mounted thereon, a conveyer mounted upon said shaft, upstanding lugs on said table adapted to engage a portion of said conveyer, and means coöperating with said lugs and said conveyer for relatively adjusting said conveyer with respect to said table.

45. In a filling unit, the combination with a cylinder, of a partition mounted for movement therein, a bushing adjustably carried on said cylinder, and means pivoted in said bushing for coöperation with said partition for regulating the movement thereof.

46. In a filling unit, the combination with a cylinder, of a partition mounted for movement therein and dividing the chamber into two compartments, a stud concentrically located on said partition, and means carried by the head of the cylinder adapted to contact with said stud and limit the movement of the partition aforesaid.

47. In a filling unit, the combination with a cylinder, of a movable partition therein dividing said cylinder into two compartments, a stud concentrically located on one side of said partition, a gage rod mounted in the head of said cylinder facing the stud of said partition and adapted to oscillate in said head, and a foot on said gage rod adapted to be swung by said rod into the path of said stud for contact therewith, thereby limiting the movement of said partition and controlling the capacity of the chambers aforesaid.

48. A unit liquid controller of the class described, comprising a measuring member having a discharge pipe connected thereto, mechanism controlling said measuring member, and means connected in said discharge pipe adapted to create a sudden temporary movement to the liquid therein to prevent dripping at the discharge end of said pipe by longitudinally jarring said discharge pipe.

49. A unit liquid controller of the class described, comprising a measuring member having a discharge pipe connected thereto, there being an opening in said discharge pipe, mechanism controlling said measuring member, a plug resiliently mounted in the opening in said discharge pipe, and means adapted to impart sudden movement to said plug and cause the latter to move the liquid in said discharge pipe and precipitate liquid hanging to the discharge end of said discharge pipe.

50. A unit liquid controller of the class described, comprising a measuring member having a discharge pipe connected thereto, mechanism controlling said measuring member, a movable member connected in said discharge pipe, and means adapted to impart sudden movement to said movable member causing the latter to move the liquid in said discharge pipe to precipitate drops of liquid at the discharge end of said discharge pipe.

51. The combination with a filling unit comprising a cylinder, of a discharge tube at one end thereof communicating alternately with the opposite ends of said cylinder, a bypass extending from said discharge tube to the opposite end of said cylinder, and means coöperating with said bypass for imparting a blow thereto.

52. The combination with a cylinder, of a discharge tube coöperating therewith, a plug mounted for reciprocation in one end of said tube, and a spring-actuated hammer coöperating with said plug.

53. The combination with a cylinder, of a discharge tube coöperating therewith, a plug, a hammer coöperating with said plug adapted to impart a sudden blow thereto to be communicated to the discharge tube aforesaid.

54. A unit liquid controller of the class described, comprising a measuring member having a discharge pipe connected thereto, mechanism controlling said measuring member, and means connected in said discharge pipe adapted to impart a sudden temporary movement to the liquid therein to prevent dripping at the discharge end of said pipe.

55. A unit liquid controller of the class described, comprising a measuring member having a discharge pipe connected thereto, there being an opening in said discharge pipe, mechanism controlling said measuring member, a plug resiliently mounted in the opening in said discharge pipe, and means adapted to impart sudden movement to said plug and cause the latter to move the liquid in said discharge pipe and precipitate liquid hanging to the discharge end of said discharge pipe.

56. A unit liquid controller of the class described, comprising a measuring member having a discharge pipe connected thereto, mechanism controlling said measuring member, a movable member connected in said discharge pipe, and means adapted to impart sudden movement to said movable member causing the latter to move the liquid in said discharge pipe to precipitate drops of liquid at the discharge end of said discharge pipe.

57. The combination with a rotary conveyer, of means for successively feeding cans to said conveyer, fillers coöperating with said conveyer, and means of communication between the fillers and the cans operable only when the cans are properly positioned in said conveyer to cause said fillers to simultaneously discharge a quantity of liquid and measure a similar quantity.

58. The combination with a rotary conveyer, having a plurality of can receiving pockets, of fillers coöperating with the pockets of said conveyer, and means of communication between the said fillers and said cans operable when said cans are properly located in said pockets to cause said fillers to simultaneously discharge a quantity of liquid and measure a similar quantity.

59. The combination with a rotary conveyer, of a plurality of measuring units, each unit adapted to automatically measure fluid during one cycle of movement of the conveyer to be discharged during the next cycle of movement.

60. The combination with a rotary conveyer, of a plurality of measuring units, each unit adapted to automatically measure fluid during one cycle of movement of the conveyer to be discharged during the next cycle of movement, and simultaneously discharge a previously measured quantity of fluid.

61. The combination with a conveyer having a predetermined period of operation, of a plurality of measuring units coöperating therewith, each unit being adapted to discharge a quantity of liquid during each period of operation and simultaneously measure a like quantity.

62. The combination with a conveyer having predetermined periods of operation, of a filling and measuring unit coöperating therewith, said unit adapted to simultaneously discharge and measure liquid during each period of operation.

63. The combination with a conveyer having continued, successive predetermined periods of operation, of a plurality of measuring and filling units coöperating therewith, each unit being arranged to simultaneously discharge and measure like quantities of liquid during each period of operation.

64. A seating device comprising a series of springs fixed at one end, the free ends thereof operating as continuations one of the other.

65. A seating device comprising a series of springs fixed at one end, the free ends thereof overlapping to create a continuous flexible surface.

66. A seating device comprising a series of S-springs each spring being fixed at one end, the free ends of said springs being bent to present a continuous bearing surface.

67. A seating device comprising a series of S-springs each spring being fixed at one end, the free ends of said springs being bent to overlap and present a continuous bearing surface.

68. A seating device comprising a series of S-springs each spring being fixed at one end, the free ends of said springs being bent to overlap and rest in a continuous curve.

69. A seating device comprising a spring fixed at one end, and having its free end curved.

70. A seating device comprising an S-spring fixed at one end, and its free end curved inwardly.

71. A seating device comprising a plurality of springs curved at corresponding ends thereof and coöperating to form a continuous curve.

72. A seating device comprising a plurality of S-springs curved inwardly at corresponding ends thereof and coöperating to form a continuous curve.

73. The combination with a shaft, of a table mounted thereon, a conveyer mounted on said shaft, and means for adjusting said conveyer relatively to said table.

74. The combination with a shaft, of a table mounted thereon, a conveyer mounted on said shaft, and means for adjusting said conveyer relatively to said table and for securing said conveyer and table together for operation in unison.

75. The combination with a casing, of a partition mounted for movement within said casing, means normally fixed relatively to said casing but operable to limit the path of movement of said partition, and means for adjusting the normal position of said last means relative to said cylinder.

76. The combination with a casing, of a partition mounted for movement in said casing, a projection on said partition, means mounted in said casing adapted to be moved into and out of position for contact with said projection, and means for regulating the position of the last said means relative to the casing.

77. The combination with a casing, of a partition mounted for movement in said casing, a projection on said partition, a gage rod mounted in said casing, a foot on said rod for coöperation with said projection. and means whereby said rod and foot may be adjusted bodily relative to said casing.

78. The combination with a casing, of a partition mounted for movement in said casing, a projection on said partition, a bushing adjustable through said casing, a gage rod pivoted in said bushing, and a foot on the end of said rod for coöperation with said projection.

In testimony whereof I have signed my name to this specification, in the presence of two subscribing witnesses, on this 28th day of June A. D. 1912.

FRED G. DICKERSON.

Witnesses:
EDGAR FRANCIS BEAUBEIN,
CHARLES H. SEEM.